(12) United States Patent
Feola et al.

(10) Patent No.: US 9,268,140 B2
(45) Date of Patent: Feb. 23, 2016

(54) MOBILE PHONE/MOBILE DEVICE MAGNIFYING SCREEN PROTECTOR AND MOBILE PHONE/MOBILE DEVICE MAGNIFYING CASE

(71) Applicants: David Joseph Feola, Vienna, VA (US); Karen Michele Hepworth, Vienna, VA (US)

(72) Inventors: David Joseph Feola, Vienna, VA (US); Karen Michele Hepworth, Vienna, VA (US)

( * ) Notice: Subject to any disclaimer, the term of this patent is extended or adjusted under 35 U.S.C. 154(b) by 70 days.

(21) Appl. No.: 13/815,353

(22) Filed: Feb. 25, 2013

(65) Prior Publication Data

US 2013/0242416 A1    Sep. 19, 2013

Related U.S. Application Data

(60) Provisional application No. 61/602,691, filed on Feb. 24, 2012.

(51) Int. Cl.
*G02B 25/00* (2006.01)
*G02B 27/02* (2006.01)
*H04M 1/02* (2006.01)
*H04M 1/22* (2006.01)

(52) U.S. Cl.
CPC ............ *G02B 27/027* (2013.01); *G02B 27/025* (2013.01); *G02B 27/026* (2013.01); *H04M 1/0279* (2013.01); *H04M 1/22* (2013.01)

(58) Field of Classification Search
CPC .. G02B 27/027; G02B 27/026; G02B 27/025; G02B 25/005
See application file for complete search history.

(56) References Cited

U.S. PATENT DOCUMENTS

| | | | |
|---|---|---|---|
| 2002/0122353 A1* | 9/2002 | Polany et al. | 367/131 |
| 2003/0095374 A1* | 5/2003 | Richardson | 361/681 |
| 2012/0154119 A1* | 6/2012 | Schepps | 340/10.1 |

* cited by examiner

*Primary Examiner* — Joseph P Martinez
(74) *Attorney, Agent, or Firm* — Sutherland Asbill & Brennan LLP

(57) ABSTRACT

User friendly magnification system with varying/optical powers of magnification, 5.0 fold, 10.0 fold, 15.0 fold, 20.0 fold. Magnifying screen protector system, designed for smart phone applications, android applications, galaxy applications, touch-pad applications, tablet applications, blackberry applications generally all mobile devices, wherein the magnifying screen and case are impregnated with conductive material during the manufacturing process which allows and promotes the user's gloved hands/fingers to mimic touch of human skin for nuance, and for tactile control capacitive touch screen devices.

18 Claims, 3 Drawing Sheets

MOBILE PHONE/MOBILE DEVICE MAGNIFYING SCREEN PROTECTOR AND MOBILE PHONE/MOBILE DEVICE MAGNIFYING CASE

CROSS-REFERENCE TO RELATED APPLICATIONS

This application claims priority to U.S. Provisional Application Ser. No. 61/602,691, filed Feb. 24, 2012, the entire contents of which is incorporated by reference herewith.

FIELD OF THE INVENTION

The disclosures of the invention relate generally to the hand held device personal electronic accessories industries. The invention presented relates to magnification. Accordingly the present invention vastly improves methods of magnification, affords choice optical powers, and is generally and specifically enhanced for touch screen technology while maintaining the platform of keyboard technology and application.

BACKGROUND OF THE INVENTION

Competition and advances in technology are staggering among the plethora of industries and specialized niche based platforms. Consumers in all walks of life are inundated with mobile devices that enhance and optimize our way of life. Visually compromised people are more susceptible and challenged by the decreased size in digital display with the majority of hand held devices. Those individuals are no longer unique to such challenges because technology continues to embrace the principles of smaller and lighter is better. Even those who are visually sound and unimpaired, discover in general, the difficulty in legibility with most hand held devices digital display. Technology has developed magnification properties available within the software of many devices, but not all applications and functions are capable of magnification. This invention will captivate all audiences by catering to those consumers who are visually acute or visually compromised.

SUMMARY OF THE INVENTION

Considering the advances in technology, this invention runs parallel with the increasing demand for friendlier use and operation of devices available on the market today. Specifically, the baby boomer generation embraces the wonders of gadgets, however not all hand held devices are as "smart" and appeasing to the eyes of the beholder. This invention affords ease by offering a choice of magnifying powers. Further, encompassing the wallet and pocketbook as "an all in one concept", combined in a magnifying case, helps the consumer lighten their load while retrieving and magnifying their data.

The present invention not only provides varying optical choices/powers, but allows for a "one touch" tactile platform, capable of delivering commands with user friendly hand held devices. Impregnating the magnifier with generalized conductive material during the manufacturing process allows the users gloved hands/fingers to mimic the touch of human skin for nuance, tactile control of capacitive touch screen devices.

The present invention not only provides varying magnifying properties, but it also provides remarkable safety and security features. The material used in constructing the case will be general, to include, but not limited to materials like leather and vinyl. Some other material choices will be metallic in nature, like, but not limited to stainless steel. More importantly generalized conductive materials used in the manufacturing process will passively resist radio frequency hacking, the latest identity theft technique that attempts to scan newer credit cards that are carried on your person.

The present invention with new and improved magnifying capability will be complimented by a light emitting diode lighting system to aid and assist the visual acuity of the digital display, icons, pictures and generalized applications of the mobile device. The light emitting diode system will be multi functional. Another unique function will be the application of directional flashlight. This feature allows the user to add extra light to the magnified material on their personal hand held device or choose to light a pathway the user maybe walking on or perhaps using the multi-functional option to light what the user maybe reading. The present inventions magnifier affords a lost and found feature. If the user places his personal hand held device other than on their body, the user can activate a light emitting diode strobe light, which will flash at 60-80 flashes/second. This unique feature will promote the user's personal device from rendered lost to now found.

DETAILED DESCRIPTION OF THE DRAWINGS

Figure 1:
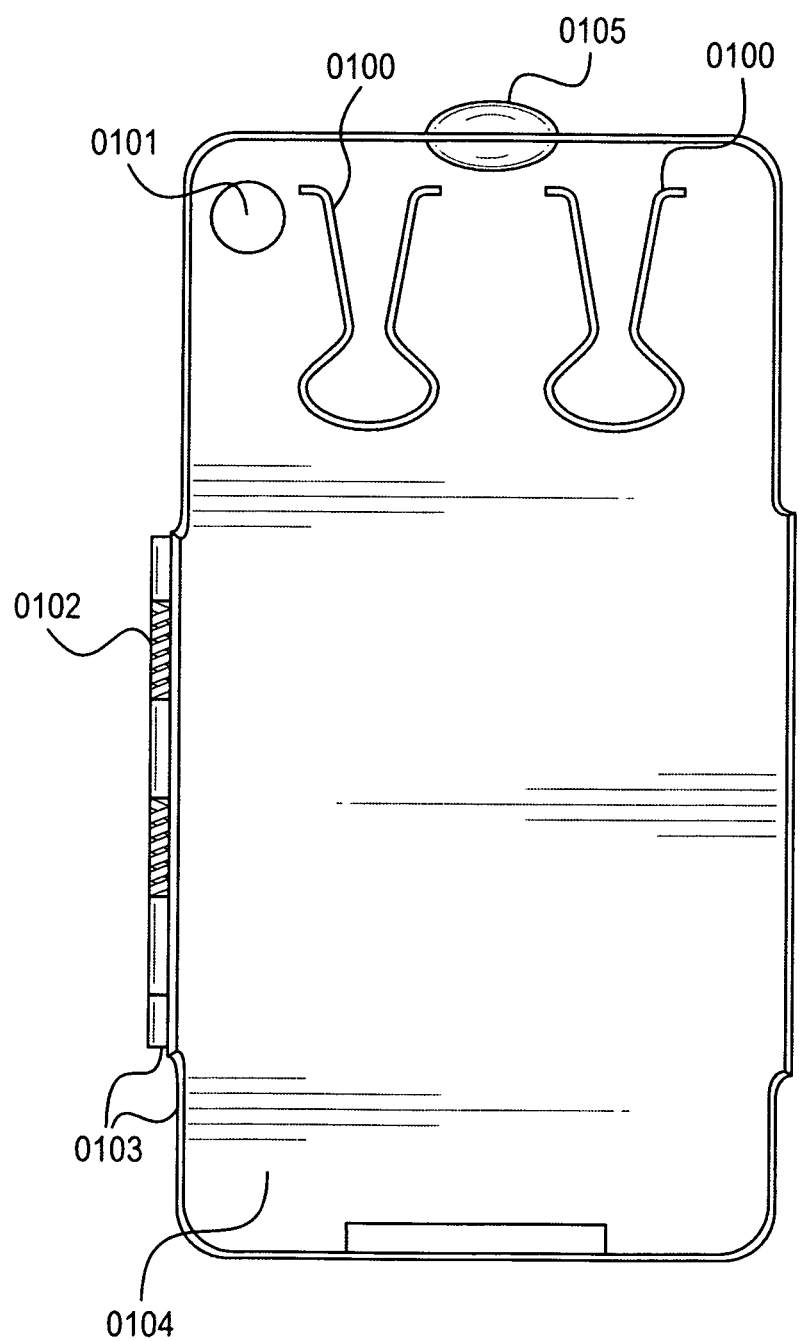
FIG. 1. Depicts the rear elevational view of the present invention.
Figure 2:
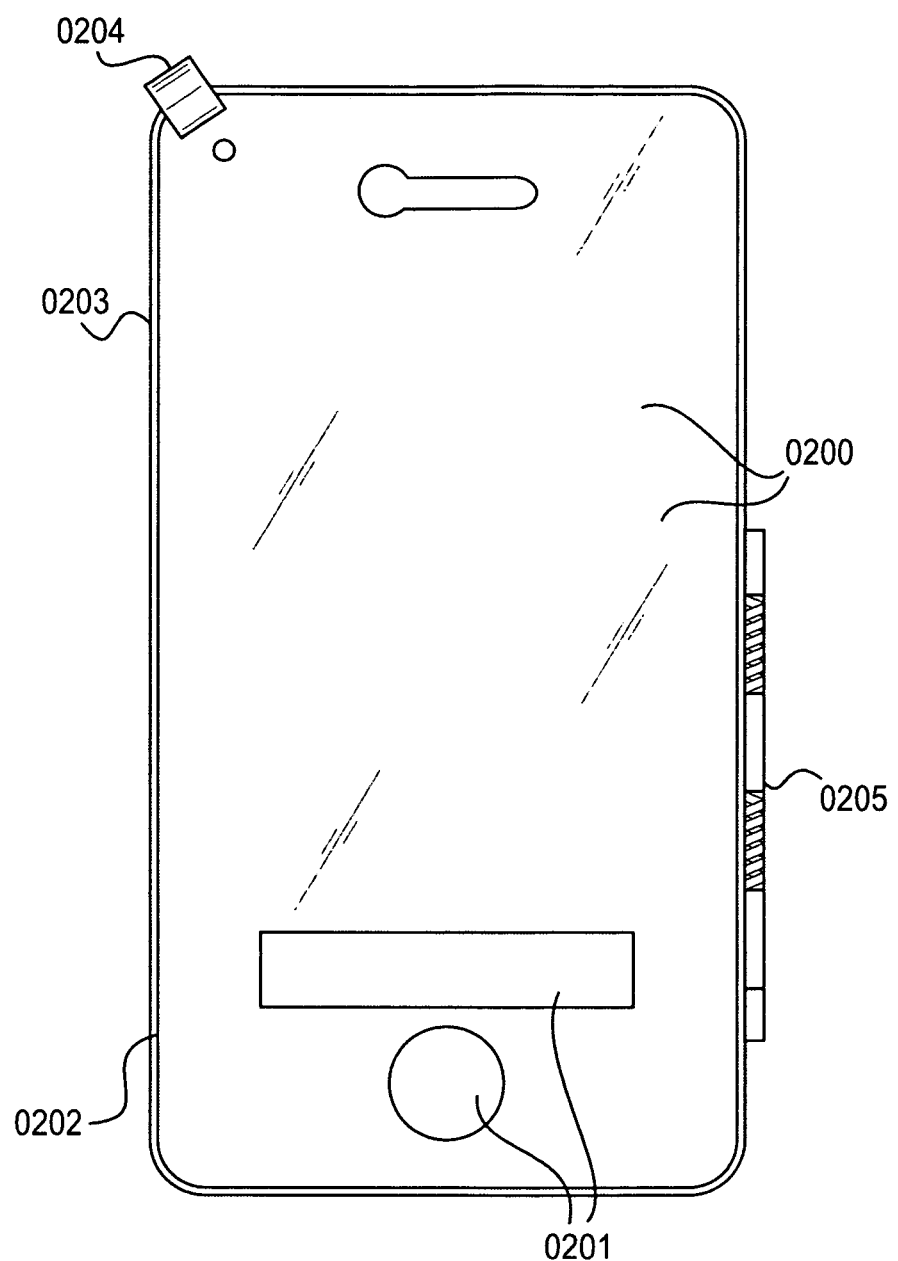
FIG. 2. Depicts the front elevational view of the present invention.
Figure 3:
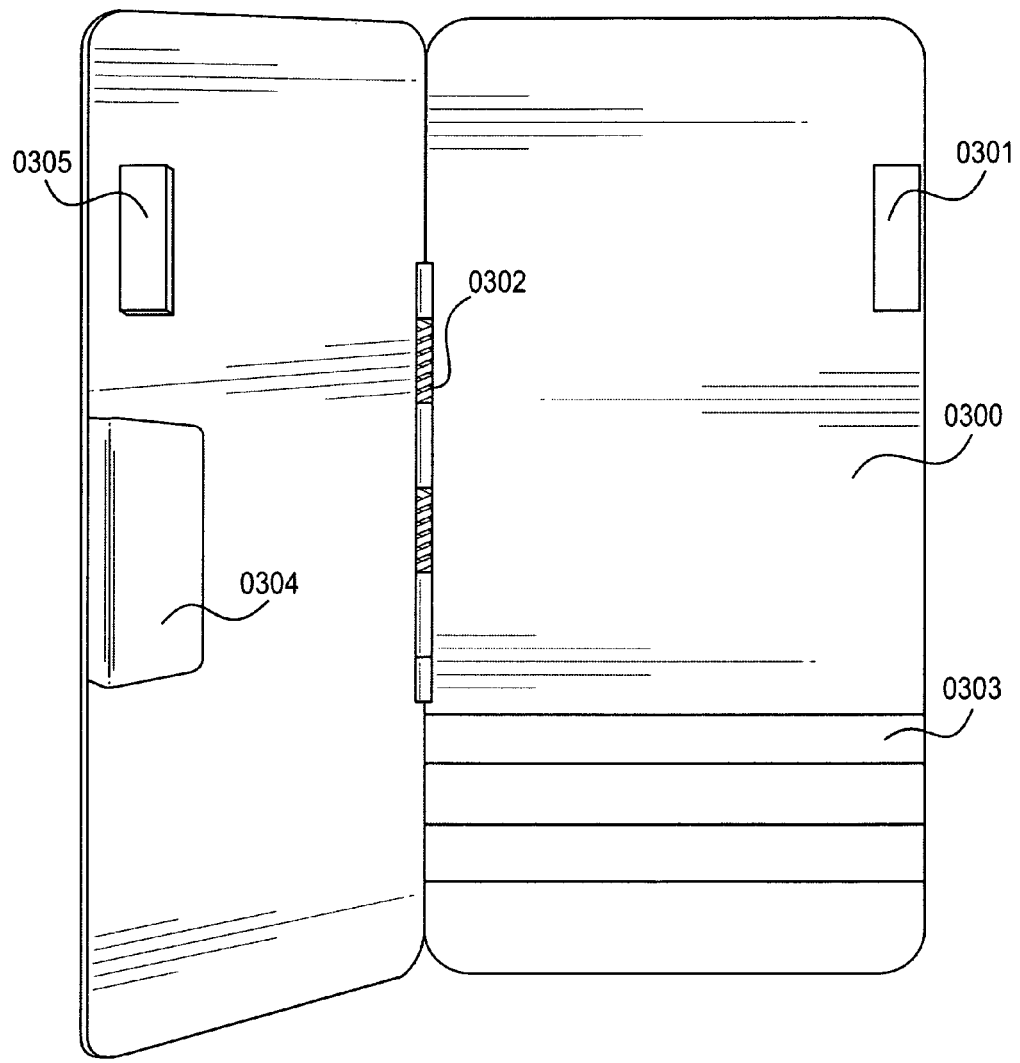
FIG. 3. Depicts the inside compartment of the rear elevational view depicted in FIG. 1.

With reference to the drawings, the preferred embodiment of the present invention is comprised of at least some of the following:

FIG. 1: Depicts the rearward view elevation.
FIG. 2: Depicts the frontal view elevation.
FIG. 3: Depicts the rearward view elevation, specifically hinged compartment.
FIG. 1.
(0100) Represents attachable clips.
(0101) Represents the battery pack.
(0102) Represents the hinge.
(0103) Represents the frame and shell for stability and impact protection.
(0104) Represents the case.
(0105) Represents the multi-functional light emitting diode lighting system.
FIG. 2.
(0200) Represents the new and improved flexible magnifier screen and screen saver. A relatively thin transparent layer or sheet composed of non-glare, smudge resistant plastic with magnifying properties.
(0201) Represents the access panel to run the personal device.
(0202) Represents the frame.
(0203) Represents the shell for stability and impact protection.
(0204) Represents the notch for securing the two elevations.
(0205) Represent the attachment and operational hinge.
FIG. 3.
(0300) Represents the built in hidden compartment within the case depicted in FIG. 1-0104.

(0301) Represents the magnet with positive polarity for closing and securing the hidden compartment.
(0302) Represents the attachment and operational hinge.
(0303) Represents storage of credit cards, identification, business cards and the like.
(0304) Represents storage of money.
(0305) Represents the magnet with negative polarity for closing and securing the hidden compartment.

What is claimed:

1. A case for holding a mobile device, said case comprising:
   a top panel comprising an outer surface and an inner surface;
   a bottom panel comprising an outer surface and an inner surface, wherein the inner surface of the bottom panel opposes the inner panel of the top panel, and the bottom panel is flexibly connected to the top panel through a hinge connected to adjoining side surfaces of the top and bottom panels;
   a magnifying flexible screen disposed on the top panel such that, when the mobile device is inserted and held between the opposing inner surfaces of the top and bottom panels, the magnifying flexible screen covers a screen of the mobile device; and
   a storage compartment located between the opposing inside surfaces of the top and bottom panels,
      wherein the magnifying flexible screen is configured to magnify the screen of the mobile device inserted between the opposing inside surfaces of the top and bottom panels that receives commands of a user that presses the magnifying flexible screen toward the screen of the mobile device, and
      wherein the magnifying screen and the case are impregnated with a conductive material during manufacturing resulting in gloved hands or fingers of the user mimicking touch of human skin for nuance and tactile control of the mobile device.

2. The case of claim 1, wherein said commands include at least one of running an application on the mobile device and activating the mobile device.

3. The case of claim 1, wherein said case further comprises a clip attachable to a pocket of the user.

4. The case of claim 1, wherein an entirety of the screen of the mobile device is covered by the magnifying flexible screen when the mobile device is inserted and held between the opposing inner surfaces of the top and bottom panels.

5. The case of claim 1, wherein the top surface further comprises a frame that holds the magnifying flexible screen.

6. The case of claim 5, wherein the frame, the top panel, and the bottom panel protect the mobile device from an impact.

7. The case of claim 1, further comprising:
   a built-in flash light that provides light to the magnifying flexible screen; and
   a power supply source for the built-in flash light stored inside the storage compartment.

8. The case of claim 1, wherein the compartment comprises a side surface extending parallel to one of a plurality of side surfaces of the case, said side surface of the compartment comprising a hinge that causes an upper surface of the compartment to rotate with respect to a bottom surface of the compartment.

9. The case of claim 1, wherein the magnifying flexible screen covers a keyboard of the mobile device such that the user interacts with the keyboard through the magnifying flexible screen, and wherein magnification properties of the magnifying flexible screen are adjustable with respect to a magnification provided by the screen of the mobile device.

10. The case of claim 1, wherein one of a hole and a notch is provided in the magnifying flexible screen to lock in place the magnifying flexible screen as the magnifying flexible screen slides over at least one of the case and the mobile device.

11. The case of claim 10, wherein said at least one of the case and the mobile device comprises a protrusion over which said one of the hole and the notch slides.

12. The case of claim 1, wherein a soft lining protects the magnifying flexible screen against scratches or blemishes.

13. The case of claim 1, further comprising a plurality of slots on the inside surface of the bottom panel that are configured to hold personal accessories of a user.

14. The case of claim 1, wherein a security of the case passively resists radio-frequency hacking, said radio-frequency hacking including an identity theft technique that attempts to scan newer credit cards.

15. The case of claim 1, wherein the magnifying flexible screen further protects the screen of the mobile device.

16. The case of claim 1, wherein the case further comprises a user activated strobe light to locate a misplaced or lost device.

17. The case of claim 13, wherein the case further comprises a sturdy magnet to keep the top and bottom panels of the case in a closed position or in an open position to provide the user access to the personal belongings or to operate the mobile device.

18. The case of claim 13, wherein the personal accessories comprise at least one of money, credit cards, house keys, or business cards.

\* \* \* \* \*

UNITED STATES PATENT AND TRADEMARK OFFICE
CERTIFICATE OF CORRECTION

PATENT NO. : 9,268,140 B2
APPLICATION NO. : 13/815353
DATED : February 23, 2016
INVENTOR(S) : Feola et al.

It is certified that error appears in the above-identified patent and that said Letters Patent is hereby corrected as shown below:

On the title page item [71] should read,

David Joseph Feola, Vienna, VA (US)

Signed and Sealed this
Twenty-sixth Day of July, 2016

Michelle K. Lee
*Director of the United States Patent and Trademark Office*